United States Patent [19]

McMaster et al.

[11] Patent Number: 5,775,643
[45] Date of Patent: Jul. 7, 1998

[54] PASSIVE FLOW CONTROL AERO-OPTICAL TURRET ASSEMBLY

[75] Inventors: Daniel McMaster, Bellevue; Robert Edward Breidenthal, Jr., Seattle, both of Wash.

[73] Assignee: The Boeing Company, Seattle, Wash.

[21] Appl. No.: 731,755

[22] Filed: Oct. 18, 1996

[51] Int. Cl.⁶ .............................. H01Q 1/28; F41G 7/26; B64C 1/38; B64C 21/06
[52] U.S. Cl. .......................... 244/130; 244/3.17; 244/210; 244/1 R; 343/708
[58] Field of Search ............................... 244/130, 3.17, 244/39, 210, 218, 1 R; 343/708; 348/117, 146, 144, 203, 167, 168, 552; 250/334, 203.1, 203.2, 203.7, 234, 236; 382/103; 89/41.21; 359/223–226, 843, 844, 857, 861, 873, 876

[56] References Cited

U.S. PATENT DOCUMENTS

| | | | |
|---|---|---|---|
| 2,554,187 | 5/1951 | Griffith | 244/130 |
| 3,128,965 | 4/1964 | Zeimer | 343/708 |
| 3,314,070 | 4/1967 | Youngren | 343/708 |
| 3,346,865 | 10/1967 | Jones, Jr. | 343/771 |
| 3,698,790 | 10/1972 | Berry . | |
| 3,708,795 | 1/1973 | Lyons | 343/708 |
| 3,974,985 | 8/1976 | Campbell et al. . | |
| 3,986,682 | 10/1976 | Dryden | 244/3.17 |
| 4,087,061 | 5/1978 | Burt . | |
| 4,371,875 | 2/1983 | Keydel | 343/708 |
| 4,677,288 | 6/1987 | Smith | 250/216 |
| 5,069,397 | 12/1991 | Haslund | 244/1 R |
| 5,434,583 | 7/1995 | Hesse et al. | 343/705 |
| 5,485,306 | 1/1996 | Kiunke et al. . | |
| 5,497,960 | 3/1996 | Previnaire . | |
| 5,529,261 | 6/1996 | Iddan . | |

FOREIGN PATENT DOCUMENTS 2618122  1/1989  France .

*Primary Examiner*—Virna Lissi Mojica
*Attorney, Agent, or Firm*—Christensen O'Connor Johnson & Kindness PLLC

[57] ABSTRACT

The invention provides an aero-optical turret assembly that provides high Strehl ratios throughout a wide range of azimuthal look angles. The turret assembly includes a duct extending from aft of the turret to a location aft of an aerodynamic bulge of the turret assembly. During flight, a low pressure zone is formed at the exit end of the duct, aft of the aerodynamic bulge. This low pressure zone causes suction of air from the inlet of the duct, and therefore away from the outer surfaces of the aero-optical turret. By judiciously selecting the shape of the aerodynamic bulge, and the size and location of the inlet end of the duct, substantially all turbulent air can be removed from around the adjacent outer surfaces of the aero-optical turret, thereby removing the source of interference with electromagnetic radiation passing through the window of the turret at azimuthal look angles greater than +60°. In accordance with the invention, a high Strehl ratio can be obtained for azimuthal look angles in the range from about +120° to about −120°.

12 Claims, 5 Drawing Sheets

PASSIVE FLOW CONTROL AERO-OPTICAL TURRET ASSEMBLY

FIELD OF THE INVENTION

The invention relates to aero-optical turrets for mounting on aircraft. In particular, the invention provides an aero-optical turret with a wide azimuthal angular range of view, while maintaining a Strehl ratio through the view range of substantially equal to 1.0.

BACKGROUND OF THE INVENTION

In general, an aero-optical port is any aircraft-mounted aperture through which electromagnetic radiation, such as infrared, laser, optical, or radar beams can be transmitted to send or receive information. The simplest form of an aero-optical port is a solid window. Such windows are commonly used on aircraft for optical transmission (i.e., pilots or passengers looking out of the window), but these windows typically do not allow the full field of view that is necessary in other applications.

A typical aero-optical turret is mounted at the front of the aircraft, so that it produces less aerodynamic drag when the craft travels through the air. Moreover, such front end-mounting transmits less vibration, while providing a greater horizontal and vertical field of view, as compared to side or crown mounting of turrets. Typically, prior art spherical turrets 10' are mounted at the front end 15' of the aircraft 20' as shown in FIGS. 1A and 1B. This type of turret provides several advantages. For example, the turret 10' can easily be rotated to sweep the entire field of view. The field of view is shown in FIG. 1B, depicting an aircraft 20' flying in the direction of the arrow that is able to rotate the turret to various "look angles" as indicated. The direction of flight LF is defined as 0°, and azimuthal look angles are measured from this reference. The aperture window 12', through which the information-carrying electromagnetic radiation passes, is shaped to conform with the surface of the spherical turret 10' rotates with the turret so that the beam of radiation maintains a consistent angle of incidence with transmitting or receiving apparatus mounted within the turret, throughout the turret's range of motion. The constant distance between the window 12' and the transmitter/receiver apparatus 14' within the turret eliminates the need to constantly adjust optical elements to compensate for variations in the distance between the window and transmitter/receiver apparatus. However, air flowing over the outer surface of the spherical turret 10' while the aircraft is in flight introduces a further limitation on view angle. The air stream forms a laminar boundary layer where it impinges on the leading curvature of the sphere 10' but this layer separates from the sphere 10' as it travels rearward from the point of impact on the sphere toward its outer circumference. Thus, when the turret 10' is rotated more than about +60° or -60° from the direction of flight (defined as 0°) then a beam of electromagnetic radiation passing through the window has to pass through the zone of air flow separation. The air in this zone is turbulent in nature and includes density fluctuations that cause aberrations in electromagnetic energy passing through it, thereby degrading the quality of the electromagnetic signal. Thus, as a practical matter, when the azimuthal angle is 60° or more from zero, there is significant interference with the electromagnetic radiation in prior art front mounted spherical turrets 10'. This interference may be measured as a Strehl ratio, defined as the ratio of electromagnetic beam center line intensity to the diffraction-limited center line intensity in the field. In general, a Strehl ratio of 1.0 indicates perfect transmission of the electromagnetic radiation. Interference with the electromagnetic radiation is caused by airflow separation around the surface of the window, and is a function of wavelength of the radiation. In general, the longer the wavelength the less serious the interference. For radar wavelengths and infrared wavelengths greater than 8 µm, the degradation of an electromagnetic signal passing through the type of shear layers encountered in an aero-optical turret is minor. However, for electromagnetic radiation in the 1 µm region the degradation can be severe, as shown in Curve A of FIG. 2.

There is a present need for an aero-optical turret that allows a wide azimuthal angle of view, while maintaining high quality of electromagnetic signal transmission, i.e., a high Strehl ratio. Preferably, the aero-optical turret should be mounted in the front of the aircraft where it incurs less drag, causes less vibration, and has enhanced horizontal (azimuthal) and vertical field of view, as compared to crown or side-mounted locations. Furthermore, the window of the aero-optical turret should present the same angle to the electromagnetic radiation signal, regardless of the azimuthal look angle. This consistency should eliminate the need to continually adjust optical elements to maintain the diffraction-limited optical performance while scanning the field of view. Moreover, the design should allow for protection of the window of the aero-optical port from bird strikes, ice storms, and during landings. Finally, the aero-optical port should be designed so that an acceptable Strehl ratio in the 1 µm passband is obtained at cruising speeds of the aircraft at a wide range of azimuthal look angles.

SUMMARY OF THE INVENTION

The invention provides a unique aero-optical turret assembly that eliminates or substantially reduces turbulence around the outer surfaces of an aero-optical turret of an aircraft during flight. In accordance with the invention, a laminar flow boundary layer is maintained around the aero-optical turret, and especially around the window of the turret, thereby minimizing turbulence-induced distortion. Advantageously, the invention may also be retrofitted to existing aero-optical turret assemblies to significantly enlarge the range of azimuthal look angles over which it can be used. Thus, a look angle of from about +120° to about -120° is achievable, with significant improvement in the Strehl ratio for look angles greater than 80° in absolute value, as shown on FIG. 2, Curve B.

In accordance with the invention, there is provided an aero-optical turret assembly with a turret mount having a forward end adapted for rotatably mounting an aero-optical turret thereto, and an aft end adapted for mounting to an aircraft. In order to eliminate or reduce the turbulent effects caused by the separation of the free stream from the aero-optical turret during flight, air is removed by suction from around the surfaces of the aero-optical turret. During operation, the spherical turret rotates about a vertical axis so that its view window rotates azimuthally to provide a wide field of view. Thus, during flight, the air stream forms a laminar boundary layer around the front air-impacted end of the optical-turret. As explained above, in prior art turrets, the boundary layer begins to separate from the surface of the turret creating turbulence, as it travels from the leading face of the turret towards its circumference. In accordance with the invention, however, there is provided an air duct in the turret mount with an inlet end located aft of the spherical turret. In one embodiment, the duct extends through the housing of the turret mount to the opposite side of the mount where it exits in an outlet. The outlet is located aft of an aerodynamic bulge that deflects the air stream thereby creating a low pressure zone aft of the bulge. Thus, during flight, the air stream flowing over the turret assembly causes a low pressure behind bulge that causes air to be drawn from the inlet of the duct to the low pressure zone from the vicinity of the inlet end of the duct, i.e., away from around the surfaces of aero-optical turret. When a zone of sufficiently low pressure is created at the duct outlet, the pressure differential between the inlet and the outlet is sufficiently large to remove a great deal of the turbulent air from the outer surface of the turret. Consequently, separation of the boundary layer is delayed and a wider range of azimuthal look angles is possible, with minimal interference, i.e., with a Strehl ratio of substantially 1.0.

In alternative embodiments, the duct for suctioning air away from the outer surface of the aero-optical turret has more than one opening adjacent the aft end of the turret. These openings may connect to a common duct to which suction is applied, and the volume of air flow through each opening may be controlled by valves or dampers that automatically adjust depending upon the location of the window of the aero-optical turret, i.e., the degree to which the turret is rotated from a position when the window faces directly forward of the assembly. Moreover, while an aerodynamic air bulge may be used to provide suction, other devices may also be used, for example, an induced draft fan may be placed inside the air-inducing duct to draw the turbulent air away from the other surfaces of the aero-optical turret.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention provides a unique aero-optical turret assembly, preferably for mounting on the front end of an aircraft, that removes turbulent air flow from around outer surfaces of the aero-optical turret thereby providing a significantly increased range of azimuthal view angle, while maintaining a high Strehl ratio. While the turret assembly is preferably mounted to the front end of an aircraft, the assembly could easily be adapted for mounting on the crown, side, or underside of an aircraft using the same principle of suctioning turbulent air away from the outer surfaces of the aero-optical turret, and in particular away from the window of the turret.

Figure 1A:
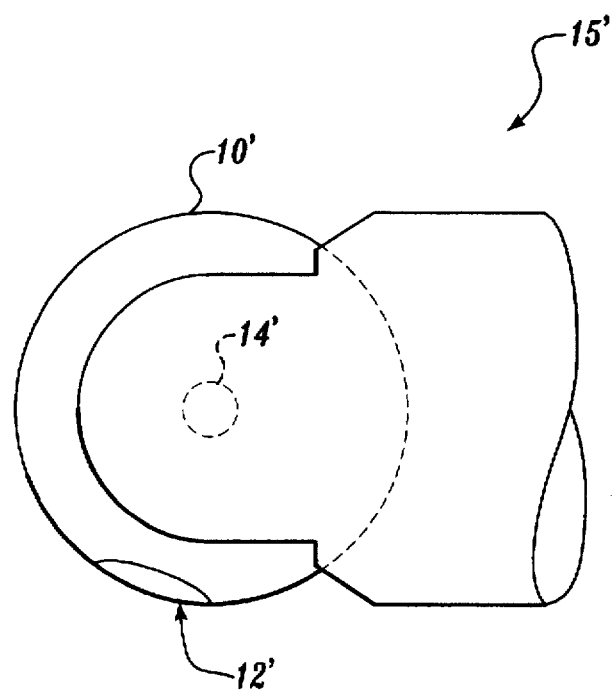
FIG. 1A is a simplified top view of an aero-optical turret rotatably mounted in an assembly that is adapted for attachment to the front end of an aircraft.
Figure 1B:
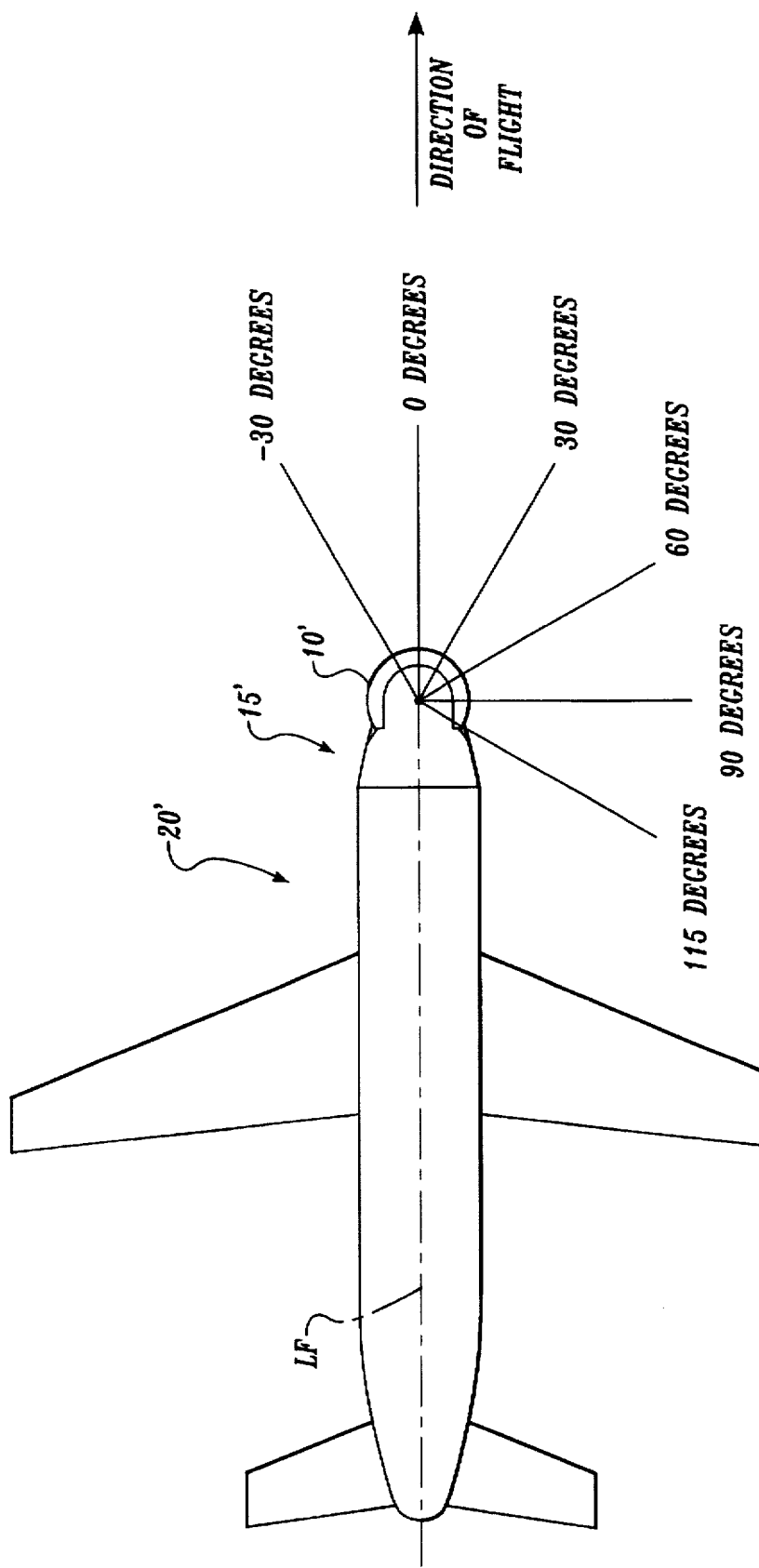
FIG. 1B is a schematic diagram of an aircraft with an aero-optical turret at its front end, indicating azimuthal angles of view through the turret.
Figure 2:
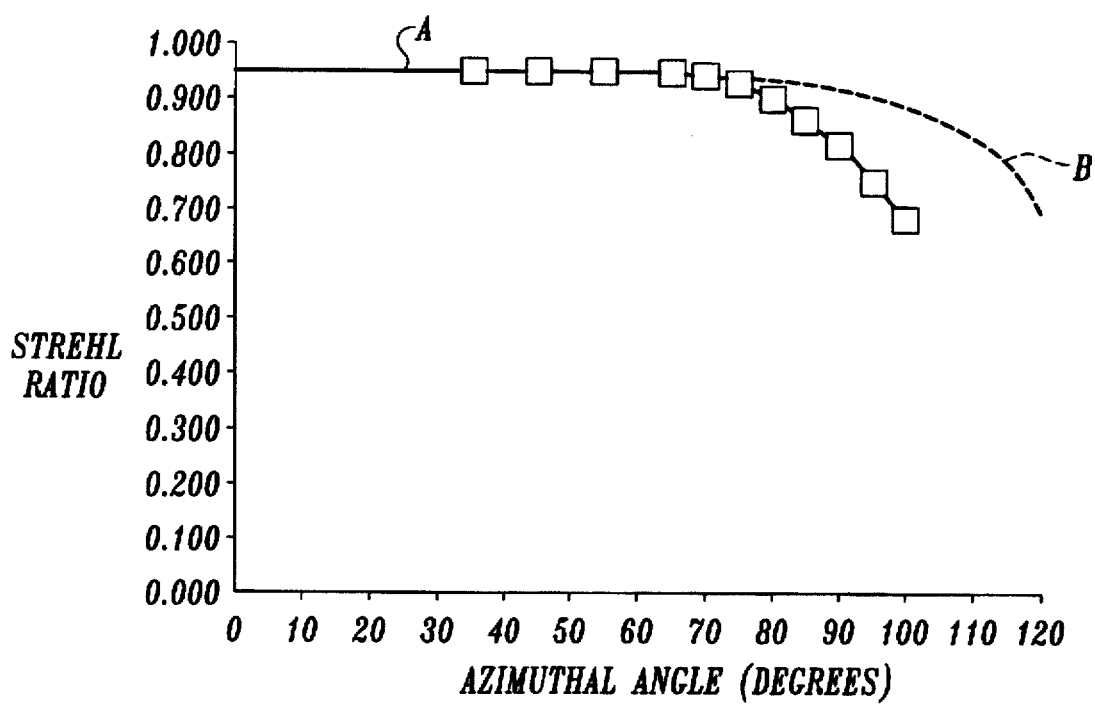
FIG. 2 is a graphical representation of Strehl ratio versus azimuthal angle for the prior art and for the invention.

In accordance with the invention, the Strehl ratio varies from 1.0 when the aero-optical turret window faces directly ahead, (i.e., is oriented at 0°), and decreases to about 0.7, when the aero-optical turret has rotated to +120° or −120° based on an electromagnetic wavelength of 1 μm. The Strehl ratio using the aero-optical turrets of the invention (Curve B) is compared with that of a prior art spherical aero-optical turret (Curve A) in FIG. 2. Clearly, the performance of the invention (Curve B) is significantly better than that of the prior art (Curve A), especially when the azimuthal angle increases to beyond about 80°. In accordance with the invention, a high Strehl ratio, i.e., a Strehl ratio of greater than about 0.85 is maintained throughout the range of azimuthal look angles of from about 0 to about +120° or −120°. Also, there is about a 10% or better improvement in Strehl ratio for look angles in the range 95° to 120° (absolute).

The invention may be better understood with reference to the attached figures, illustrating specific preferred embodiments of the invention. Clearly, the principles of the invention may be applied to other embodiments, that are also within the scope of the invention as described herein and claimed herebelow. Thus, the invention is not limited to the specific embodiments shown in the drawings.

Figure 3A:
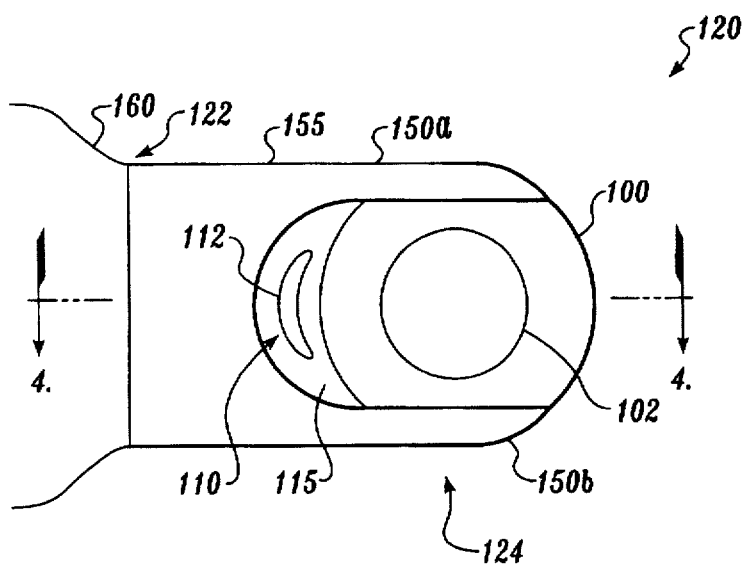
FIG. 3A is a side view of an embodiment of an aero-optical assembly in accordance with the invention.
Figure 3B:
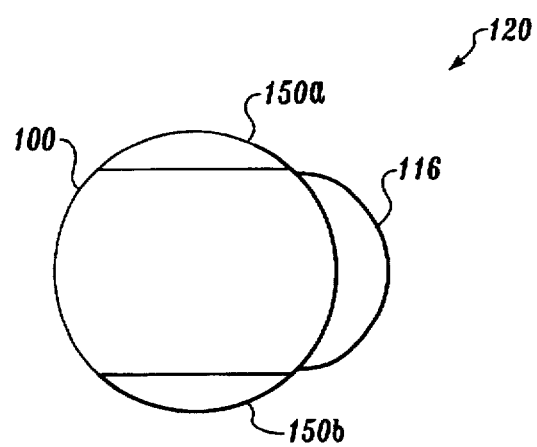
FIG. 3B is a front view of an embodiment of the aero-optical assembly of the invention of FIG. 3A.
Figure 3C:
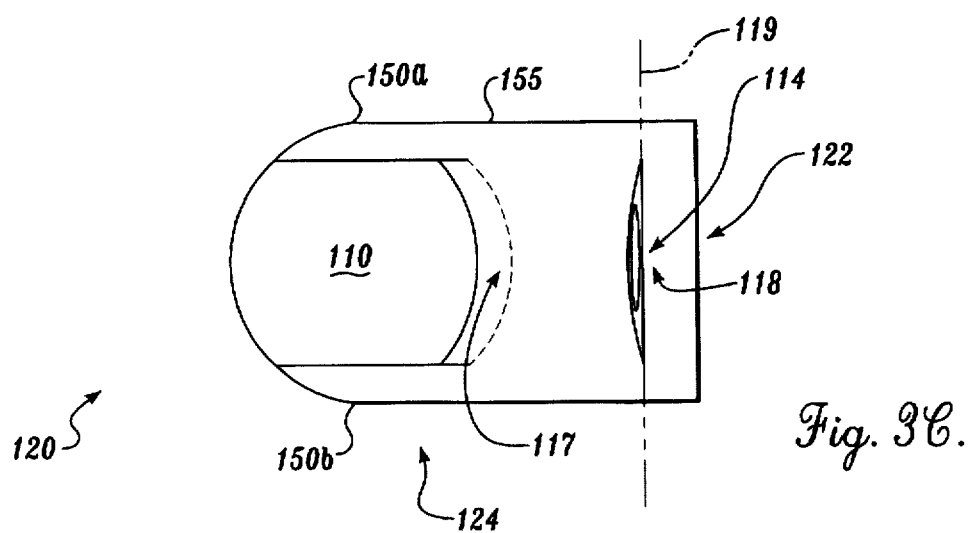
FIG. 3C is a view of another side of the embodiment of FIGS. 3A and 3B.

FIGS. 3A, 3B and 3C illustrate, in simplified form, an aero-optical turret assembly in accordance with the invention. The assembly 120 is substantially cylindrical in shape, and has an aft end 122 that is adapted for rotatable mounting to the front end 160 of an aircraft so that the turret can scan to either side of the aircraft equally. The forward end 124 of the assembly 120 is forked into an upper turret retainer 150a, and a lower turret support base 150b. A substantially spherical aero-optical turret 100 is rotatably mounted between the upper retainer 150a and the support base 150b. In the embodiment shown, the aero-optical turret 100 has a window 102, of substantially circular shape conforming to the spherical curvature of the turret, extending across a central portion of the spherical turret 100. As can be seen in FIG. 3A, the body 155 of the turret mount includes a duct inlet opening 112, located aft of the spherical turret 100. The duct opening is preferably sufficiently large so that it is able to carry substantially all the turbulent air generated around the turret 100 away from surfaces of the turret, when the aircraft is in flight. As shown, the duct opening is circular, and it is disposed in a curved surface 115 of the substantially cylindrical mount body 155, that has a curvature approximating the outer curvature of the adjacent spherical turret 100, and that is spaced from the aft side of the turret 100. The distance between the inlet 112 and the turret aft surface is selected to allow turbulent air to be suctioned into the inlet from around the window 102, when looking at an angle from about 60° to about 120°.

The other side of this embodiment of the aero-optical turret assembly is shown in FIG. 3C. Details of this side may be better understood by concurrently considering FIG. 3B, a front view of the assembly. As shown in FIG. 3B, the assembly includes an outboard extending aerodynamic bulge 116. The bulge 116 commences its outward protrusion from a leading forward edge 117 of the turret mount body 155, and extends rearward to terminate in a plane 119, shown in FIG. 3C. A low pressure zone 118 is created in the volume behind the plane 119, when an aircraft carries the turret assembly in flight. An outlet end 114 of a duct 110 that extends from the inlet end 112 exits in the zone 118. (Duct 110 is show in FIGS. 4, 5, and 6.) Thus, as the embodiment of FIGS. 3A, 3B and 3C moves through the air, mounted to the front end of an aircraft, the air stream flows over the spherical turret 100 and over the aerodynamic bulge 116 creating a low pressure zone 118 at the vicinity of the outlet end of the duct 110. This low pressure zone suctions air through the inlet end of the duct 112, away from adjacent outer surfaces of the aero-optical turret 100, substantially removing most of the turbulent air. Consequently, the outer surfaces of the turret 100, and in particular the outer surface of window 102, is only covered with a thin attached boundary layer. As a result, high Strehl ratios are achievable, and electromagnetic signals, whether infrared, laser, visible light, or radar and the like, pass through window 102 without significant interference from turbulent air.

Figure 4:
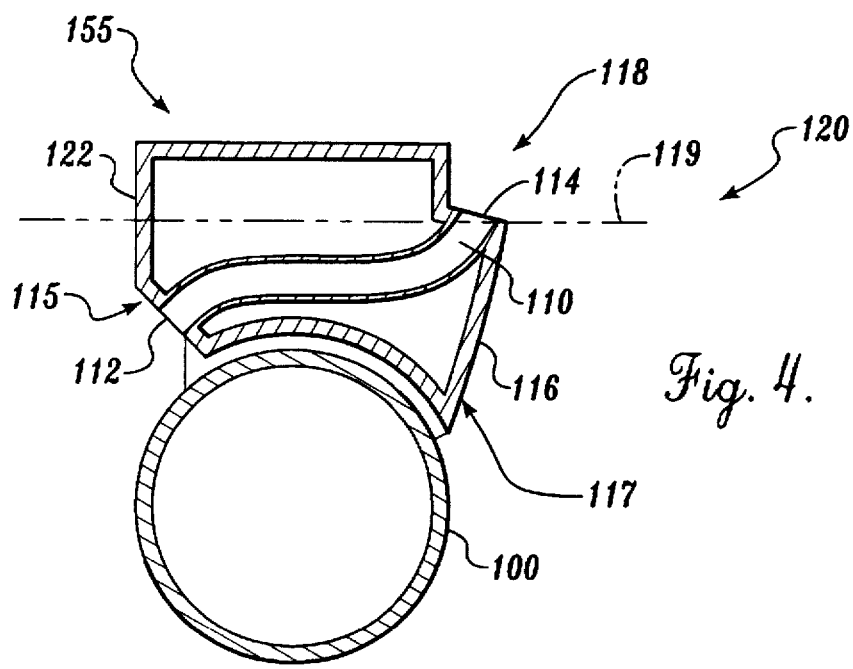
FIG. 4 is a schematic plan cross-sectional view of the aero-optical assembly of the invention, illustrating the use of a single air-suctioning duct with an aerodynamic bulge to provide suction.
Figure 5:
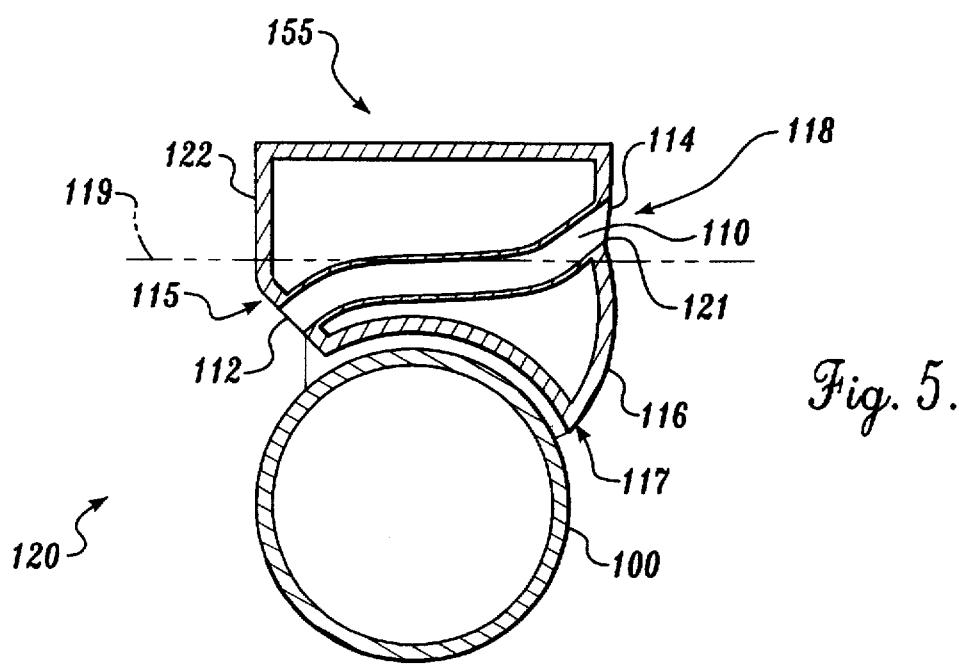
FIG. 5 is a schematic cross-sectional top-view of another embodiment of an aero-optical assembly of the invention.

FIG. 4 illustrates an embodiment of the aero-optical assembly of the invention with a flatter, less pronounced aerodynamic bulge 116 than the assembly of FIG. 5. The plane of the duct outlet 114 at the rear of the bulge is at an angle of about 10° to a lateral plane 119 of the assembly. This creates a powerful suction force in the zone 118, for removing air from around the spherical aero-optical turret 100.

In FIG. 5 the bulge 116 is more pronounced. A rear edge of the bulge is virtually coincident with the leading edge 121 of the duct outlet 114. Thus the transition from the bulge 116 to the aft end 155 of the assembly is smooth, in an aerodynamic sense.

Both FIGS. 4 and 5 illustrate embodiments where the duct 110 has a single inlet 112 and a single outlet 114. However, other options are clearly also available. For example, the duct 110 may have two inlet ends. This may provide better control to ensure the removal of air from around the outer surfaces of the spherical turret 100. In order to control air flow from the multiple ducts, each of the ducts may be provided with dampers. The operation of these dampers may be coordinated with the rotation of the spherical turret 100, so that they selectively open or close depending upon the position of the window 102. This may ensure better removal of turbulent air from around the surface of the turret in the vicinity of the window, as the turret rotates.

Moreover, rather than rotating the entire turret assembly 120 relative to the aircraft (to move the bulged-out side of the turret 180°), the turret assembly may be supplied within inflatable bulges. Thus, with dual controllable duct openings (one on each side of the turret, and the ability to inflate either bulge selectively, the turret can look maximally in the azimuthal field without need to rotate the entire assembly 120° by 180° relative to the aircraft.

While the preferred embodiment of the invention has been illustrated and described, it will be apparent that various changes can be made therein without departing from the spirit and scope of the invention.

The embodiments of the invention in which an exclusive property or privilege is claimed are defined as follow:

1. An aircraft mountable aero-optical turret assembly comprising:
   (a) an aero-optical turret mount, the mount comprising a housing having a forward end adapted for rotatably mounting an aero-optical turret thereto, and an aft end adapted for mounting to an aircraft, the housing comprising an outboard extending aerodynamic bulge on an outer surface of the housing, the bulge comprising a bulge aft zone located aft of the forward end of the housing;
   (b) a rotatable aero-optical turret mounted to the forward end of the turret mount;
   (c) at least one duct extending through the housing of the turret assembly, the at least one duct having:
      (i) at least one inlet end adjacent, and aft of, the aero-optical turret, and
      (ii) an outlet end, in fluid communication with the bulge aft zone, so that when air flows over the assembly, the outlet end of the duct is exposed to low pressure in the bulge aft zone.

2. The assembly of claim 1 wherein the rotatable turret is substantially spherical.

3. The assembly of claim 1 wherein the rotatable turret is substantially spherical and the turret comprises a planar window.

4. The assembly of claim 1, wherein the at least one inlet end of the duct of the housing is located on a first side of a longitudinal plane of the aircraft, and the outlet end is on a second side of the longitudinal plane.

5. The assembly of claim 1, wherein the at least one duct comprises a single duct.

6. The assembly of claim 1, wherein the aft end of the housing is adapted for rotatably mounting the turret assembly to an aircraft.

7. The assembly of claim 1, wherein the aft end of the mount is adapted for mounting to a front end of an aircraft.

8. An aero-optical turret assembly for mounting to an aircraft, the assembly comprising:
   (a) an aero-optical turret mount comprising a housing adapted for attachment to an aircraft;
   (b) an aero-optical turret rotatably mounted to the turret mount to scan in an azimuthal field of view; and
   (c) an air suction inlet aft of the turret for removing turbulent air from around another surface of the turret, when the assembly is mounted to an aircraft and the aircraft is in flight.

9. The assembly of claim 8, wherein the air suction inlet is in fluid communication with an air outlet, the outlet in a zone of low pressure created when the aircraft is in flight.

10. The assembly of claim 8, wherein the air suction inlet is in fluid communication with an inlet side of an induced draft fan.

11. The assembly of claim 9, wherein a Strehl ratio of the signals through a window of the turret is in the range about 1.0 to about 0.7, when the turret is rotated through the azimuthal view angle range −120° to +120° for electromagnetic radiation of wavelength about 1 μm.

12. The assembly of claim 1, wherein a Strehl ratio of the signals through a window of the turret is in the range about 1.0 to about 0.7, when the turret is rotated through the azimuthal view angle range −120° to +12° for electromagnetic radiation of wavelength about 1 μm.

* * * * *

UNITED STATES PATENT AND TRADEMARK OFFICE
CERTIFICATE OF CORRECTION

PATENT NO. : 5,775,643
DATED : July 7, 1998
INVENTOR(S) : D. McMaster et al.

It is certified that error appears in the above-identified patent and that said Letters Patent is hereby corrected as shown below:

COLUMN     LINE

6              18              "claim I" should read --claim 1--
(Claim 2,   line 1)

6              60              "+12°" should read --+120°--
(Claim 12,  line 2)

Signed and Sealed this

First Day of December, 1998

Attest:

BRUCE LEHMAN

Attesting Officer                Commissioner of Patents and Trademarks